(12) United States Patent
Jiang et al.

(10) Patent No.: US 8,356,173 B2
(45) Date of Patent: Jan. 15, 2013

(54) CONFIGURATION METHOD, SYSTEM AND DEVICE OF CRYPTOGRAPHICALLY GENERATED ADDRESS

(75) Inventors: Sheng Jiang, Shenzhen (CN); Zhongqi Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 12/646,581

(22) Filed: Dec. 23, 2009

(65) Prior Publication Data

US 2010/0100722 A1    Apr. 22, 2010

Related U.S. Application Data

(63) Continuation of application No. PCT/CN2008/070894, filed on May 6, 2008.

(30) Foreign Application Priority Data

Jun. 29, 2007 (CN) .......................... 2007 1 0123100

(51) Int. Cl.
*H04L 29/06* (2006.01)
(52) U.S. Cl. ........ 713/162; 709/220; 709/223; 709/225; 709/226; 713/150; 713/151; 726/3
(58) Field of Classification Search .......... 709/220–222, 709/226, 245; 713/150, 151; 726/3
See application file for complete search history.

(56) References Cited

U.S. PATENT DOCUMENTS

| 7,366,898 B2 * | 4/2008 | Evans et al. .................. 713/160 |
| 2003/0084293 A1 | 5/2003 | Arkko et al. |
| 2003/0200437 A1 | 10/2003 | Oishi |
| 2004/0193875 A1 | 9/2004 | Aura |
| 2006/0047826 A1 * | 3/2006 | Cromer et al. ............... 709/229 |
| 2006/0077908 A1 | 4/2006 | Park et al. |
| 2006/0248230 A1 * | 11/2006 | Kempf et al. ................ 709/245 |
| 2006/0253704 A1 | 11/2006 | Kempf et al. |

FOREIGN PATENT DOCUMENTS

CN    1452356 A    10/2003

(Continued)

OTHER PUBLICATIONS

T. Aura, RFC 3972, Cryptographically Generated Addresses (CGA), Mar. 2005.*

(Continued)

*Primary Examiner* — Jeffrey Pwu
*Assistant Examiner* — Thomas C Lauzon
(74) *Attorney, Agent, or Firm* — Brinks Hofer Gilson & Lione

(57) ABSTRACT

A configuration method of a cryptographically generated address (CGA) is disclosed. The configuration method is used to enable a generated CGA to satisfy requirements of a network configuration, and includes the following steps. A Dynamic Host Configuration Protocol (DHCP) server receives a client configuration information sent from a client. The DHCP server generates a CGA according to the client configuration and the network configuration from the DHCP server. The DHCP server delivers the CGA to the client. The network configuration is made as a reference when the CGA is generated, which overcomes a disadvantage that the CGA generated by the client cannot satisfy the requirements of the network configuration in the prior art. Thus, the generation of CGA can be intervened at a network management level, and a management capability of the network is improved.

22 Claims, 7 Drawing Sheets

FOREIGN PATENT DOCUMENTS

| | | |
|---|---|---|
| CN | 1859437 A | 11/2006 |
| GB | 2367986 A | 4/2002 |

OTHER PUBLICATIONS

R. Droms et al. RFC 3315, Dynamic Host Configuration Protocol for IPv6 (DHCPv6), Jul. 2003.*

Office Action issued in corresponding European Patent Application No. 08734249.9, mailed Jul. 5, 2011.

Extended European Search Report issued in corresponding European Patent Application No. 08734249.9, mailed May 10, 2010.

Written Opinion of the International Searching Authority issued in corresponding PCT Patent Application No. PCT/CN2008/070894, mailed Aug. 21, 2008.

Arkko et al., "Securing IPv6 Neighbor and Router Discovery", ACM, Sep. 2002.

Aura, "Cryptographically Generated Addresses (CGA)" Network Working Group, The Internet Society. Mar. 2005.

Droms et al., "Dynamic Host Configuration Protocol for IPv6 (DHCPv6)" Network Working Group, The Internet Society. Jul. 2003.

Kempf et al., "Secure IPv6 Address Proxying using Multi-Key Cryptographically Generated Addresses (MCGAs)", Mobility Optimizations RG, The Internet Society. Aug. 22, 2005.

Kim et al., "The Study on Secure Auto-Configuration Technology in IPv6", Advanced Communication Technology, ICACT 205. Feb. 2005.

Postel, "User Datagram Protocol" RFC 768, Aug. 28, 1980.

Office Action issued in corresponding Chinese Patent Application No. 200710123100.3, mailed Feb. 3, 2012.

\* cited by examiner

CONFIGURATION METHOD, SYSTEM AND DEVICE OF CRYPTOGRAPHICALLY GENERATED ADDRESS

CROSS-REFERENCE TO RELATED APPLICATIONS

This application is a continuation of International Application No. PCT/CN2008/070894, filed on May 6, 2008, which claims priority to the Chinese Patent Application No. 200710123100.3 filed on Jun. 29, 2007, both of which are hereby incorporated by reference in their entireties.

FIELD OF THE DISCLOSURE

The present disclosure relates to the field of network communication technology, and more particularly to a configuration method, system, and device of a cryptographically generated address (CGA).

BACKGROUND OF THE DISCLOSURE

Internet Protocol version 6 (IPv6) is sometimes referred to as the Next Generation Internet Protocol, and is a new IP protocol for replacing the current Internet Protocol version 4 (IPv4). Currently, in the Internet, mostly the IPv4 protocol is applied. However, as the application of the Internet is continuously enlarged, the IPv4 protocol encounters significant problem, for example, the address exhaustion. The IPv6 is proposed to overcome the problems and the disadvantages of the IPv4. Meanwhile, the IPv6 is improved in many aspects, for example, routing and automatic configuration. Therefore, the IPv6 will gradually replace the IPv4.

A cryptographically generated address (CGA) is a special IPv6 address, in which an interface identifier part is generated through a one-way cryptographic hash algorithm by using a public key in combination with auxiliary information. When the CGA is used, a receiving party needs to re-calculate the hash value, and compares the re-calculated hash value with the address interface identifier part of a sending party, so as to verify the binding relationship between the public key and the address of the sending party. For the protection of a network message, the public key and the auxiliary information are attached to the network message, and the network message is signed using the corresponding private key. In the CGA solution, the authentication of the address is achieved in an IP layer without other authoritative certificate systems or other security architecture, so the CGA solution is a simple and highly efficient security solution. In the definition of the CGA, a source of the public key/private key pair is not designated, the public key/private key pair may be assigned by an authoritative certificate system, or calculated by the client, or may be generated by other sources.

During the implementation of the present disclosure, the inventors find that the conventional art has at least the following problems.

In the conventional art, the CGA is generated by the client, and it is assumed that the generation of the CGA does not need any network information, and the generation of the CGA lacks information of the network level, so the generated CGA may not satisfy the requirement of the network configuration. Further, when the CGA is generated, a large computational consumption is required, but usually the computing capability of the client is rather limited. In particular, the mobile client or the low-end sensor cannot bear or occupy too many computing resources, so that the generation of the CGA will result in lower performance of the client, especially when the mobile client is frequently handed over between access networks and needs to frequently change the network address, because the burden of generating the CGA is greatly increased at that time.

SUMMARY OF THE DISCLOSURE

Various embodiments of the present disclosure provide a configuration method, system, and device of a cryptographically generated address (CGA), in order to eliminate a defect that a CGA generated by a client cannot satisfy requirements of a network configuration in the prior art.

Accordingly one embodiment of the present disclosure provides a configuration method of a CGA. The configuration method is used to enable a generated CGA to satisfy requirements of a network configuration, and includes: receiving, by Dynamic Host Configuration Protocol (DHCP) server, client configuration information sent from a client; generating, by the DHCP server; generating a CGA according to the client configuration and a network configuration from the DHCP server; and delivering the CGA to the client.

Another embodiment of the present disclosure provides a configuration method of a CGA. The configuration method is used to enable a generated CGA to satisfy requirements of a network configuration, and includes: Generating, by a client, a CGA; sending, by the client, the generated CGA to a DHCP server, and requesting the DHCP server to determine whether the generated CGA satisfies requirements of a network configuration; and if the generated CGA does not satisfy the requirements of the network configuration, generating a new CGA.

Another embodiment of the present disclosure provides a configuration system of a CGA, which includes a DHCP server and at least one client. The client is configured to send client configuration information of the client to the DHCP server. The DHCP server is configured to generate a CGA according to the client configuration information sent from the client and network configuration from the DHCP server, and deliver the CGA to the client.

Another embodiment of the present disclosure further provides a DHCP server, which includes a configuration receiving and saving module, a CGA generating module, and a CGA delivering module. The configuration receiving and saving module is configured to receive and save client configuration information sent from a client. The CGA generating module is configured to generate a CGA according to the client configuration information saved by the configuration receiving and saving module and network configuration from the DHCP server. The CGA delivering module is configured to deliver the CGA generated by the CGA generating module to the client.

Another embodiment of the present disclosure provides a configuration system of a CGA, which includes a DHCP server and at least one client. The DHCP server is configured to determine whether a CGA generated by the client satisfies requirements of a network configuration. The client is configured to generate the CGA.

Another embodiment of the present disclosure provides a client, which includes a CGA generating module and a CGA determining module. The CGA generating module is configured to generate a CGA. The CGA determining module is configured to send the CGA generated by the CGA generating module to a DHCP server, and request the DHCP server to determine whether the CGA satisfies requirements of a network configuration.

Compared with the prior art, the present disclosure has the following advantages.

Through DHCP message exchange between the DHCP server and the client, the network configuration is made as a reference when the CGA is generated, which overcomes the defect that the CGA generated by the client cannot satisfy the requirements of the network configuration in the prior art, so that the generation of CGA is intervened on the network management level, and the network management capability is improved.

DETAILED DESCRIPTION OF THE EMBODIMENTS

Figure 1:
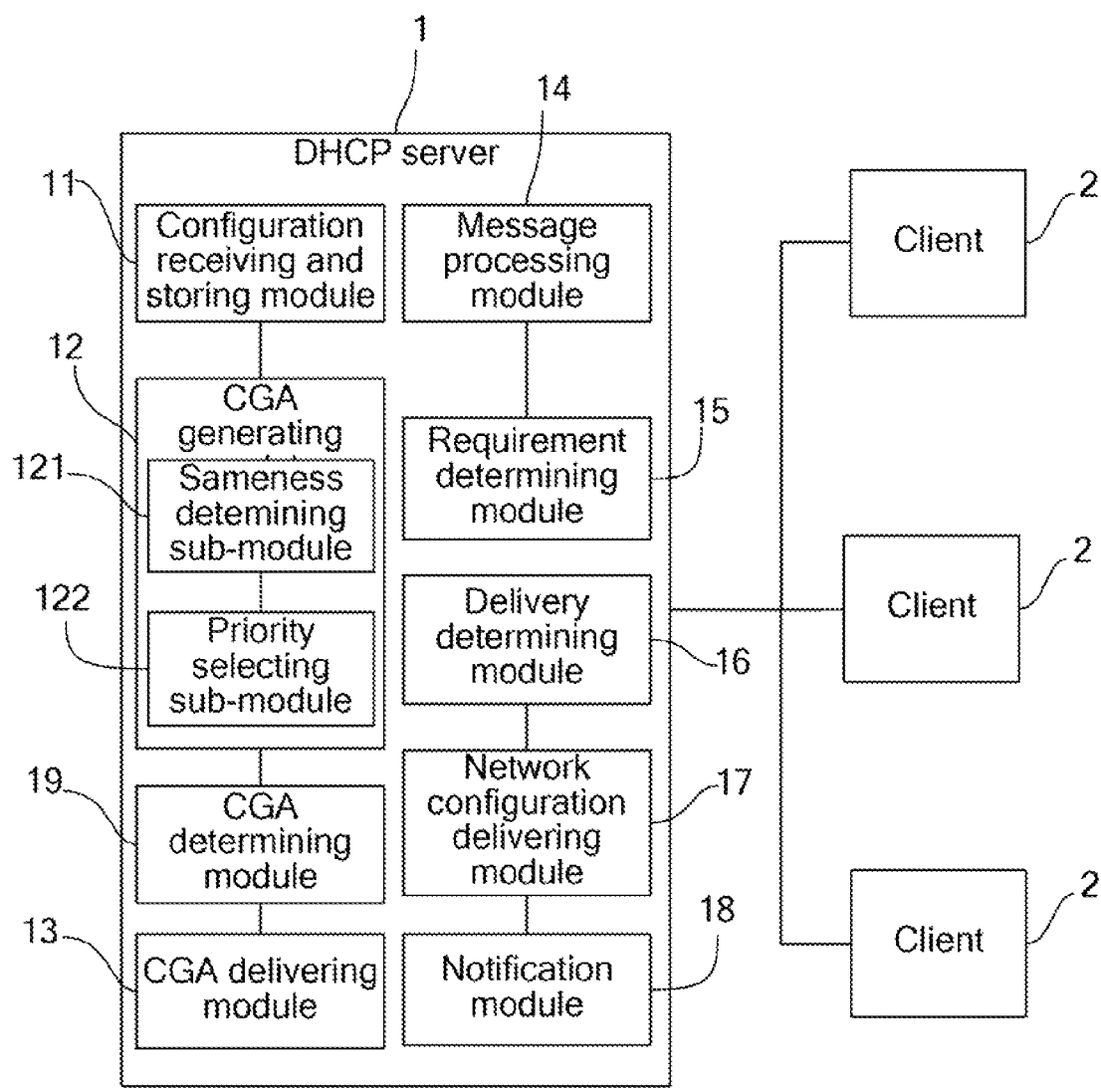
FIG. 1 is a structural view of a first configuration system of a CGA according to an embodiment of the present disclosure.

In the embodiments of the present disclosure, through DHCP message exchange, a network configuration is made as a reference when a CGA is generated, so that the generated CGA satisfies requirements of the network configuration. The embodiments of the present disclosure provides a plurality of methods for generating a CGA satisfying the requirements of the network configuration, in which the CGA may be generated by the client and a DHCP server determines whether the CGA generated by the client satisfies the requirements of the network configuration, or the CGA is generated by the DHCP server and determined by the DHCP server. The methods for generating the CGA according to the embodiments of the present disclosure are only several illustrative embodiments, any method for generating the CGA satisfying the requirements of the network configuration through the DHCP message exchange shall fall within the protection scope of the embodiments of the present disclosure.

The DHCP is a protocol in the Transmission Control Protocol (TCP)/IP protocol suite. The DHCP is designed by Internet Engineering Task Force (IETF) for implementing automatic configuration of a client, and is capable of automatically assigning an IP address, a Domain Name System (DNS) server address, and other additional configuration information to a client. The DHCP describes an interaction process of automatically configuring a client through DHCP message exchange between the DHCP server and the client. According to different IP versions, the DHCP correspondingly includes DHCP version 4 (DHCPv4) and DHCP version 6 (DHCPv6). The CGA solution is used in the IPv6, so the DHCP in the following description is the DHCPv6.

A server and a client exchange the DHCP message by using a User Datagram Protocol (UDP). The client sends and receives the DHCP message by using a local link address, and the server receives the DHCP message from the client by using a reserved local link multicast address. According to whether it is needed to assign the IP address to the client, the message exchange between the DHCP server and the client includes a two-message mode and a four-message mode.

Specifically, the two-message mode is as follows. When it is unnecessary to assign an IP address to a client, the client acquires the configuration information, for example, the DNS server address, through a DHCP request and a DHCP reply. Firstly, the client sends a DHCP "solicit message" to the local link multicast address, and indicates to request the configuration information. The DHCP server receiving the solicit message sends a "reply message" carrying the requested configuration information to the client.

Specifically, the four-message mode is as follows. If a client needs to be assigned with an IP address, the client needs to firstly determine a DHCP server, and requests for assigning an IP address and other configuration information. In this mode, four messages are involved. The client firstly sends a DHCP "solicit message" to the local link multicast address, so as to find a valid DHCP servers. All the DHCP servers satisfying the requirements of the client respond with an "advertisement message", so as to indicate that the DHCP servers can provide an IP address and configuration information. The client selects a DHCP server, and sends a DHCP "request message" to the selected DHCP server. The DHCP server sends the "reply message" carrying the requested IP address and configuration information to the client.

The detailed implementation of the embodiments of the present disclosure is described with the accompanying drawings and embodiments.

The embodiments of the present disclosure provide two configuration systems of a CGA, in which the CGA satisfying the requirements of the network configuration is generated through the DHCP message exchange. In a first system, the CGA is generated by the DHCP server or a third party server, while in a second system, the CGA is generated by a client, and the DHCP server determines whether the CGA generated by the client satisfies the requirements of the network configuration.

FIG. 1 is a structural view of a first configuration system of a CGA according to an embodiment of the present disclosure. Referring to FIG. 1, the system includes a DHCP server 1 and at least one client 2. A DHCP server supports all the clients in the network to generate a CGA. Thus, the network configuration of the DHCP server is extended, and the CGA solution of the whole network can be extended or evolved without modifying the clients one by one. Additionally, the CGA is generated by the DHCP server, so the client does not need to perform the operation for generating the CGA, so as to lower a calculation cost of the client, thereby solving the problem of a weak operation capability of the client, alleviating the burden of the client, and improving the performance. The client 2 is configured to send client configuration information thereof to the DHCP server 1 through the DHCP request message. The client configuration information includes a CGA relevant requirement parameter designated by the client and a client public key. The CGA relevant requirement parameter designated by the client may include a CGA security level; if an agent client public key is known by the client 2, the client 2 sends the agent client public key together with the client public key and the CGA relevant requirement parameter designated by the client. The CGA parameter may be added to a DHCP request message when the DHCP request message uses an extended DHCP protocol.

The DHCP server 1 is configured to parse a DHCP request message sent from the client 2, and acquire the client configuration carried in the DHCP request message. The DHCP server 1 generates a CGA according to the acquired client configuration and the network configuration preset in the DHCP server 1. The network configuration preset in the DHCP server 1 may include parameters such as the agent client public key or a CGA security level set by the DHCP server. If the acquired client configuration is different from the network configuration preset in the DHCP server 1, the configuration with a higher priority is selected from the client configuration and the network configuration to generate the CGA. Thus, through the network configuration from the DHCP server 1, all the clients 2 in the network are uniformly controlled, for example, all the clients 2 in the network are uniformly set to generate the CGA. If the client configuration is same as the network configuration, the client configuration or the network configuration may be randomly selected to generate the CGA. Usually, the priority of the network configuration from the DHCP server 1 is set to be higher, so when the client configuration is different from the network configuration, the network configuration is selected to generate the CGA. The DHCP server 1 delivers the generated CGA and a CGA parameter data set corresponding to the generated CGA to the client 2 through the DHCP reply message. The CGA parameter data set is generated when the CGA is generated. The client 2 may directly use the CGA assigned by the DHCP server and the CGA parameter data set corresponding to the CGA, and a receiving end may verify the generated CGA according to the CGA parameter data set. The CGA parameter data set includes actual parameter values of all the information actually used when the CGA is generated, for example, the CGA parameter data set may include the agent client public key, the actual CGA security level used finally, or other configuration information. The CGA and the corresponding CGA parameters also may be added to the reply message by using the extended DHCP protocol.

When the CGA is calculated, a large calculation amount is required. If too many clients in the network need the DHCP server to generate the corresponding CGA, the burden of the DHCP server is too heavy. Therefore, in one embodiment of the present disclosure, a method that a third party server generates the CGA is provided. The DHCP server sends the corresponding network configuration information and client configuration information to a third party server, and the third party server generates a CGA and returns the generated CGA to the DHCP server, thus the burden of the DHCP server may be alleviated. Similarly, when the third party server generates the CGA, if the network configuration is different from the client configuration, the configuration with a higher priority is selected from the network configuration and the client configuration to generate the CGA. According to the priorities of the network configuration and the client configuration, the DHCP server sends the configuration information with a higher priority to the third party server, and the third party server directly generates the CGA without determination after receiving the configuration information.

The DHCP server 1 includes a configuration receiving and storing module 11, a CGA generating module 12, and a CGA delivering module 13. The configuration receiving and saving module 11 is configured to receive and save the client configuration information sent from the client 2, in which the client configuration includes a CGA relevant requirement parameter designated by the client and a client public key. The CGA relevant requirement parameter designated by the client may include the CGA security level. The CGA generating module 12 is configured to generate the CGA according to the client configuration information stored by the configuration receiving and storing module 11 and the network configuration from the DHCP server 1, in which the network configuration includes the agent client public key, the CGA security level set by the DHCP server, and other parameters. If the client configuration is different from the network configuration, the CGA generating module 12 selects the configuration with a higher priority from the client configuration and the network configuration to generate the CGA. The CGA delivering module 13 is configured to deliver the CGA generated by the CGA generating module 12 and the CGA parameter data set corresponding to the generated CGA to the client 2 through the DHCP reply message, in which the corresponding CGA parameter data set includes all the information used when the CGA is generated, and the receiving end may verify the generated CGA according to the CGA parameter data set.

The DHCP server 1 may further include a message processing module 14 and a requirement determining module 15. The requirement determining module 15 is configured to determine whether the DHCP server 1 satisfies requirements of the client 2 according to the solicit message received by the message processing module 14 and sent from the client 2. Firstly, the client 2 sends the DHCP solicit message to the local link multicast address, and the DHCP solicit message is configured to find a valid DHCP server 1. The message processing module 14 is configured to receive the solicit message sent from the client 2, and responds with the advertisement message to the client 2 when the requirement determining module 15 determines that the DHCP server 1 satisfies the requirements of the client 2, so as to notify the client 2 that the DHCP server 1 may provide the required address and the network configuration information. However, the address and the configuration information are not in the advertisement message, and the advertisement message only has a function of prompting the client 2. The requirements of the client mainly include whether the DHCP server can provide relevant network configuration, or whether the DHCP server can provide the service of generating a CGA in place of the client when the client requires the DHCP server to generate a CGA. The DHCP server 1 may further include a delivery determining module 16, a network configuration delivering module 17, and a notification module 18. The delivery determining module 16 is configured to determine whether to deliver the requested network configuration when receiving the solicit message of requesting the network configuration sent from the client 2. The request message is used to request the DHCP server 1 to deliver the network configuration instead of find a valid DHCP server. The network configuration delivering module 17 is configured to deliver the network configuration to the client 2 through the DHCP answer message when the delivery determining module 16 determines to deliver the requested network configuration. The CGA parameter may be added to the reply message by using the extended DHCP protocol. The notification module 18 is configured to instruct the client 2 to report the client configuration when the delivery determining module 16 determines not to deliver the requested network configuration. If the DHCP server 1 designates itself to generate a CGA for the client 2, or the DHCP server 1 considers that the network configuration cannot be delivered, the DHCP server 1 determines not to deliver the network configuration to the client 2, and requires the client 2 to report the client configuration to the DHCP server 1, so that the DHCP server 1 generates a CGA for the client 2.

The DHCP server 1 further includes a CGA determining module 19, configured to determine whether the CGA generated by the CGA generating module 12 satisfies the requirements of the network configuration, instruct the CGA delivering module 13 to deliver the generated CGA to the client 2 if the CGA satisfies the requirements of the network configuration, and instruct the CGA generating module 12 to generate a new CGA if the generated CGA does not satisfy the requirements of the network configuration. The requirements of the network configuration may include a plurality of contents, for example, uniqueness of the generated CGA in the network is detected, that is, it is detected whether the CGA is unique in the network; if the CGA is not unique, the generated CGA does not satisfy the requirements of the network configuration, and a new CGA needs to be generated.

The CGA generating module 12 may include a sameness determining sub-module 121 and a priority selecting sub-module 122. The sameness determining sub-module 121 is configured to determine whether the client configuration is same as the network configuration. Each client configuration may be different, and the network configuration from the DHCP server 1 is set for the clients in the whole network, as a result, when generating a CGA, the DHCP server 1 may encounter the situation that the client configuration is different from the network configuration. The priority selecting sub-module 122 is configured to select the configuration with a higher priority to generate the CGA when the sameness determining sub-module 121 determines that the client configuration is different from the network configuration. If the client configuration is different from the network configuration, the priority selecting sub-module 122 selects the configuration with a higher priority from the client configuration and the network configuration to generate the CGA. Thus, through the network configuration from the DHCP server 1, all the clients 2 in the network may be uniformly controlled. For example, the security level of generating a CGA in the network configuration may be uniformly set, and the priority of the network configuration may be set to be higher than that of the client configuration of each client 2, so that each client 2 may generate the CGA of each client according to the security level of generating the CGA in the network configuration.

In the first configuration system of a CGA, through the DHCP message exchange between the DHCP server and a client, the network configuration is made as a reference when a CGA is generated, so that the generation of a CGA may be intervened at the network management level, and an administrable capability of the network is improved. Optionally, the algorithm of generating a CGA may be executed in the DHCP server, which may lower cost of the client. Optionally, by extending the network configuration from the DHCP server, the CGAs generated by all the clients in the network may be extended, which may improve an extensibility of the CGAs.

Figure 2:
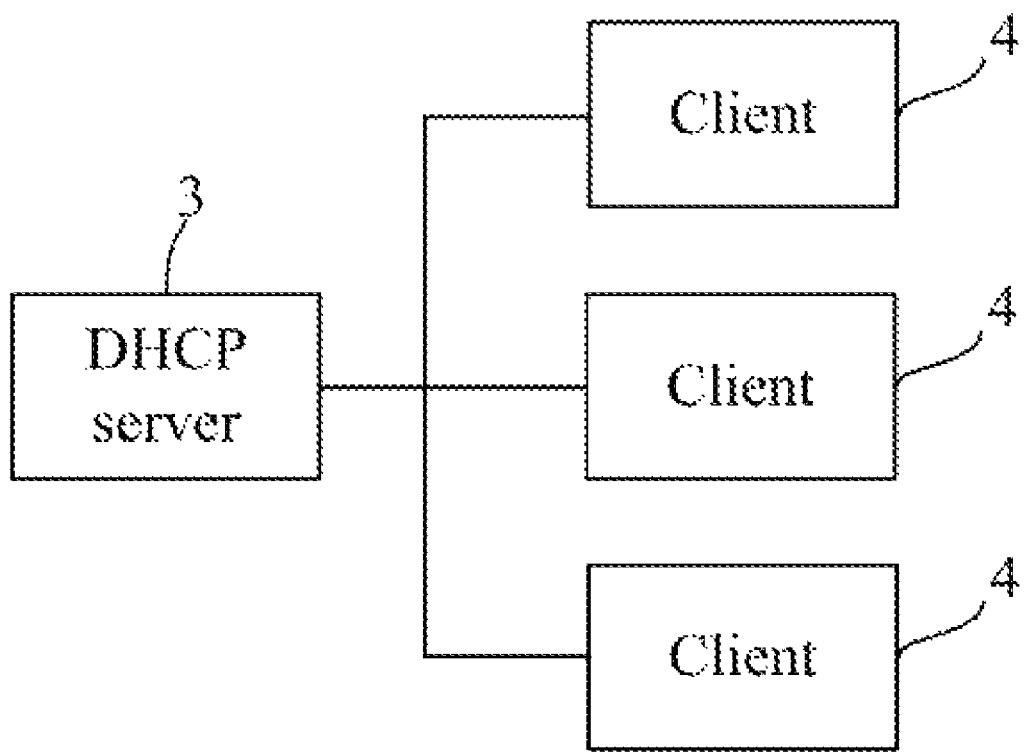
FIG. 2 is a structural view of a second configuration system of a CGA according to an embodiment of the present disclosure.

FIG. 2 is a structural view of a second configuration system of a CGA according to an embodiment of the present disclosure. Referring to FIG. 2, the second configuration system of a CGA includes a DHCP server 3 and at least one client 4. The DHCP server 3 may provide the network configuration to all the clients 4 in the network to generate a CGA, and determine whether a CGA generated by each client 4 satisfies the requirements of the network configuration. Thus, through extending the network configuration from the DHCP server, the CGA solution of the whole network may be extended or evolved without modifying the clients one by one. The DHCP server 3 is configured to determine whether a CGA generated by the client 4 satisfies the requirements of the network configuration, and provide the network configuration to the client 4. The client 4 is configured to generate a CGA. The CGA generated by the client 4 may be generated according to the client configuration or according to the client configuration and the network configuration. Thus, the client 4 may generate the CGA according to the client configuration thereof, and the DHCP server 3 needs to determine whether the generated CGA satisfies the requirements of the network configuration. When the DHCP server 3 determines that the CGA generated by the client 4 satisfies the requirements of the network configuration, the network configuration from the DHCP server 3 is not required, and the message exchange between the DHCP server 3 and the client 4 may be reduced. When the DHCP server 3 determines that the generated CGA does not satisfy the requirements of the network configuration, the client 4 generates a new CGA according to the network configuration after acquiring the network configuration from the DHCP server 3.

Figure 3:
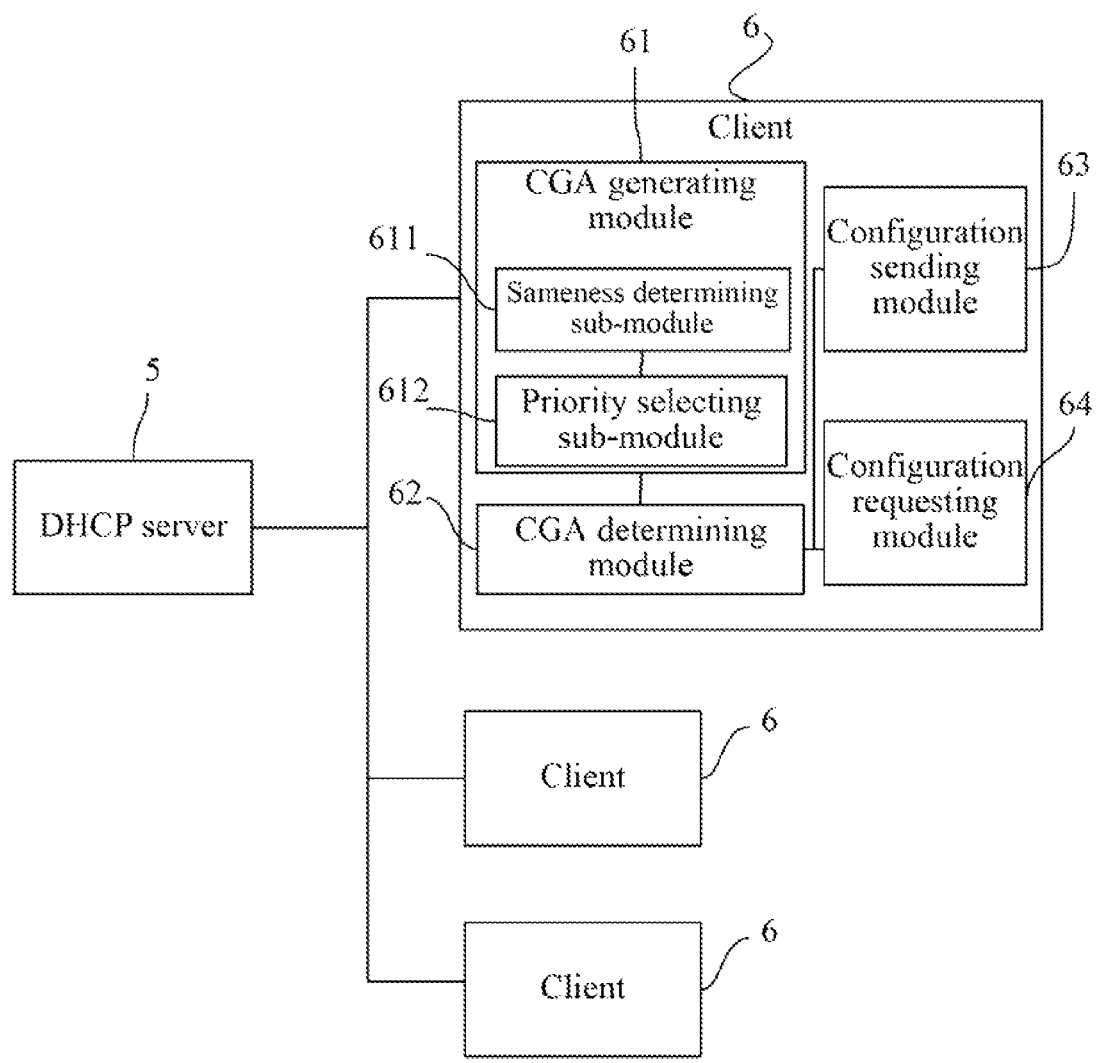
FIG. 3 is a structural view of a third configuration system of a CGA according to an embodiment of the present disclosure.

FIG. 3 is a structural view of a third configuration system of a CGA according to an embodiment of the present disclosure. Referring to FIG. 3, the configuration system of a CGA includes a DHCP server 5 and at least one client 6. When the CGA generated by the client 6 is determined not satisfying the requirements of the network configuration, the DHCP server 5 or a third party server generates a new CGA. The DHCP server 5 may be optionally configured to require the client 6 to report the client configuration when determining that the CGA generated by the client 6 does not satisfy the requirements of the network configuration. The DHCP server 5 generates a new CGA according to the client configuration and the network configuration, and delivers the new CGA and the CGA parameter data set corresponding to the new CGA to the client 6 when determining that the newly generated CGA satisfies the requirements of the network configuration. The client 20 may directly use the CGA assigned by the DHCP server 5 and the corresponding CGA parameter data set, and the receiving end may verify the generated CGA through the CGA parameter data set. The CGA parameter data set includes the actual parameter values of all the information actually used when the CGA is generated, for example, the agent client public key, the actually used CGA security level used finally, or other configuration information. The DHCP server may entrust the third party server to generate a corresponding CGA.

The client 6 includes a CGA generating module 61 and a CGA determining module 62. The CGA generating module 61 is configured to generate a CGA, in which the CGA generated by the client 6 may be generated according to only the client configuration or according to the client configuration and the network configuration. The CGA determining module 62 is configured to send the CGA generated by the CGA generating module 61 to the DHCP server 5, and request the DHCP server 5 to determine whether the CGA generated by the CGA generating module 61 satisfies the requirements of the network configuration. The CGA generated by the CGA generating module 61 may be sent to the DHCP server 5 through the DHCP solicit message, and the generated CGA is added to the DHCP solicit message through the extended DHCP protocol. When receiving the solicit message, the DHCP server 5 determines whether the CGA carried in the solicit message satisfies the requirements of the network configuration, and returns a confirmation result to the CGA determining module 62 of the client 6.

For the mode in which the DHCP server 5 generates a new CGA when determining that CGA generated by the client does not satisfy the requirements of the network configuration, the client 6 may optionally include a configuration sending module 63. The configuration sending module 63 is configured to send the client configuration to the DHCP server 5 when the CGA determining module 62 receives a confirmation result that the generated CGA by the client 6 does not satisfy the requirements of the network configuration from the DHCP server 5, so that the DHCP server 5 generates a new CGA.

When determining that the generated CGA by the client 6 does not satisfy the requirements of the network configuration, the DHCP server 5 delivers the network configuration, and the client 6 generates a new CGA. Therefore, the client 6 may optionally include a configuration requesting module 64.

The configuration requesting module 64 is configured to send a solicit message of requesting the network configuration to the local link multicast address, and instruct the CGA generating module 61 to generate a CGA according to the network configuration and the client configuration if the DHCP server 5 delivers the network configuration.

The CGA determining module 62 may be optionally configured to instruct the configuration requesting module 64 to re-send a solicit message of requesting the network configuration to the local link multicast address when receiving the confirmation result that the CGA does not satisfy the requirements of the network configuration, in which the confirmation result is from the DHCP server 5. The CGA generating module 61 may be optionally configured to generate a new CGA according to the network configuration requested by the configuration requesting module 64. Therefore, when receiving a notification from the CGA determining module 62, the configuration requesting module 64 re-sends a solicit message of requesting the network configuration to the local link multicast address, so as to request the DHCP server 5 to deliver the network configuration, so that the client 6 generates a new CGA. If the DHCP server 5 delivers the network configuration, the CGA generating module 61 is notified to generate a new CGA according to the delivered network configuration and client configuration. If the DHCP server 5 does not deliver the requested network configuration, the DHCP server 5 cannot distribute the network configuration or designate itself to generate a CGA for the client 6, so that the DHCP server 5 generates a new CGA, and the configuration requesting module 64 instructs the configuration sending module 63 to send the client configuration to the DHCP server 5. The DHCP server 5 generates a new CGA and determines whether the new CGA satisfies the requirements of the network configuration, and delivers the new CGA to the client 6 when determining that the new CGA satisfies the requirements of the network configuration. The CGA generating module 61 may be optionally configured to generate a new CGA according to the network configuration delivered by the DHCP server when the DHCP server 5 delivers the network configuration, and send the newly generated CGA to the DHCP server 5 for determination. If the determination is not passed, the DHCP server 5 is required to deliver the network configuration again to generate a new CGA, until the new CGA passes the determination performed by the DHCP server 5.

In this embodiment, the configuration requesting module 64 of the client 6 may directly request the DHCP server 5 to deliver the network configuration, the client 6 generates a CGA according to the network configuration and the client configuration, and the DHCP server 5 determines whether the CGA satisfies the requirements of the network configuration.

Similarly, the CGA generating module 61 may optionally include a sameness determining sub-module 611 and a priority selecting sub-module 612. The sameness determining sub-module 611 is configured to determine whether the client configuration is the same as the network configuration. Each client configuration may be different, and the network configuration from the DHCP server 5 is set for the clients in the whole network, so when generating a CGA, the DHCP server 5 may encounter the situation that the client configuration is different from the network configuration. The priority selecting sub-module 612 is configured to select the configuration with a higher priority to generate the CGA when the sameness determining sub-module 611 determines that the client configuration is different from the network configuration. Thus, all the clients 6 in the network may be uniformly controlled through the network configuration from the DHCP server 5, for example, the security level of generating a CGA in the network configuration is uniformly set, and the priority of the network configuration is set to be higher, so that each client 6 generates a CGA according to the security level of generating the CGA in the network configuration.

In the configuration system of a CGA, through the DHCP message exchange between the DHCP server and the client, the network configuration is made as the reference when a CGA is generated, so that the generation of CGA may be intervened at the network management level, and the administrable capability of the network may be improved. Optionally, if the network configuration from the DHCP server is extended, the CGAs generated by the clients in the network may be extended, and thereby an extensibility of the CGAs may be improved.

An embodiment of the present disclosure provides three methods for generating a CGA satisfying a network configuration through DHCP message exchange between a DHCP server and a client. A CGA may be generated by the DHCP server, or the CGA may be generated by the client, and then the CGA generated by the client is determined by the DHCP server. A CGA generated by the client first needs not to satisfy certain requirement; the client can generate the CGA according to only the client configuration, or according to the client configuration and the network configuration, that is, according to the configuration with a higher priority.

Figure 4:
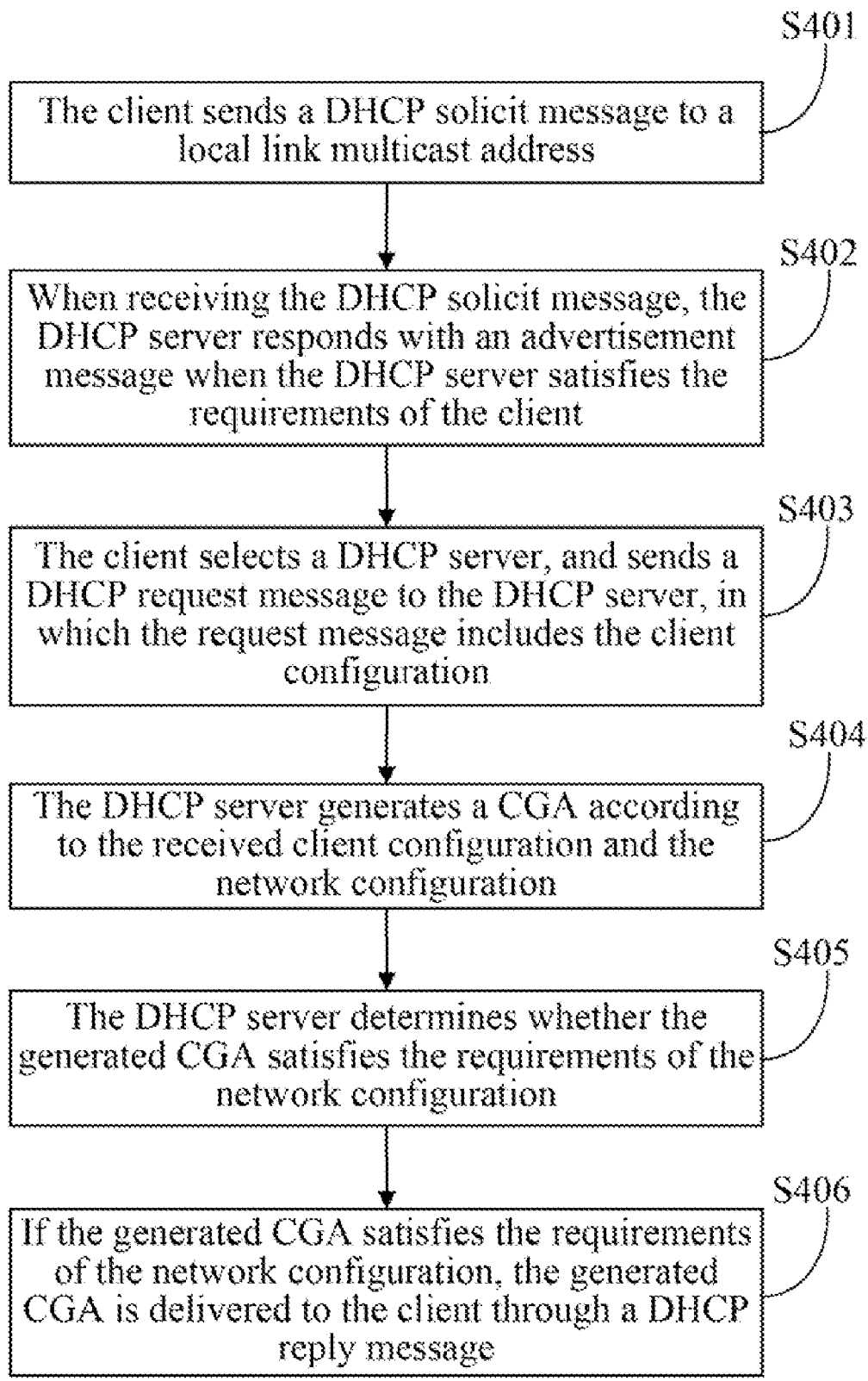
FIG. 4 is a flow chart of a configuration method of a CGA according to a first embodiment of the present disclosure.

FIG. 4 is a flow chart of a configuration method of a CGA according to an embodiment of the present disclosure. Referring to FIG. 4, in this embodiment, a DHCP server and at least one client are involved. One DHCP server may support all the clients in the network to generate the CGA. Through extending the network configuration from the DHCP server, the CGA solution of the whole network may be extended or evolved without modifying the clients one by one. Additionally, when a CGA is generated by the DHCP server, the client does not need to perform the operation for generating the CGA, so as to a calculation cost of the client is reduced, and a weak operation capability of the client may not be a bottleneck, the burden of the client may be alleviated, and the performance may be improved. The method of this embodiment may include the following steps.

In step S401, the client sends a DHCP solicit message (referring to the four-message mode provided in the present disclosure) to a local link multicast address, so as to find a valid DHCP server in the network.

In step S402, when receiving the DHCP solicit message, the DHCP server determines whether the DHCP server satisfies the requirements of the client, so that all the DHCP servers receiving the solicit message and satisfying the requirements of the client respond with an advertisement message, so as to notify the client that the DHCP server can provide a required address and the network configuration information; however, the address and the configuration information are not in the advertisement message, and the advertisement message only has a function of prompting the client. The requirements of the client mainly refer to whether the DHCP server can provide the relevant network configuration, or whether the DHCP server can provide the service of replacing the client to generate the CGA when the client requires the DHCP server to generate a CGA.

In step S403, the client selects one DHCP server from the responding DHCP servers, and sends a DHCP request message to the DHCP server. The request message includes the client configuration, in which the client configuration includes a CGA relevant requirement parameter designated by the client and a client public key, the CGA relevant requirement parameter designated by the client may include a CGA security level; if an agent client public key is known. The client sends the agent client public key together. The CGA parameter may be added to the DHCP request message when the DHCP request message uses an extended DHCP protocol.

In step S404, the DHCP server generates a CGA according to the received client configuration and network configuration.

The DHCP server parses the request message sent from the client, and acquires the client configuration carried in the request message. The DHCP server generates a CGA according to the parsed client configuration and the network configuration preset in the DHCP server, in which the network configuration includes the agent client public key, the CGA security level set by the DHCP server, or other parameters. If the client configuration is different from the network configuration, the configuration with a higher priority may be selected from the client configuration and the network configuration to generate a CGA. Thus, through the network configuration from the DHCP server, all the clients in the network are uniformly set, for example, the security level of generating the CGA by all the clients in the network may be uniformly set. If the client configuration is the same as the network configuration, the client configuration or the network configuration may be randomly selected to generate a CGA. Usually, the priority of the network configuration from the DHCP server is set to be higher than all the client configurations, so when the client configuration is different from the network configuration, the network configuration is selected to generate the CGA.

In step S405, the DHCP server determines whether the generated CGA satisfies the requirements of the network configuration. The requirements of the network configuration include a plurality of contents, for example, uniqueness of the generated CGA in the network is detected, that is, it is detected whether a CGA is unique in the network; if the CGA is not unique, the generated CGA does not satisfy the requirements of the network configuration, and a new CGA needs to be generated.

In step S406, if a generated CGA satisfies the requirements of the network configuration, the generated CGA is delivered to the client through a DHCP reply message. The client may directly use the CGA assigned by the DHCP server and the corresponding CGA parameter data set of the CGA assigned, and a receiving end may verify the generated CGA through the CGA parameter data set. The CGA parameter data set is generated when the CGA is generated. The CGA parameter data set may include actual practical parameter values of all the information actually used when the CGA is generated, for example, the agent client public key, the actual CGA security level used finally, or other configuration information. The CGA and the corresponding CGA parameters may be added to the answer message by using the extended DHCP protocol.

When the CGA is calculated, a large calculation amount is required. If too many clients in the network need a DHCP server to generate the corresponding CGA, the burden of the DHCP server may become too heavy. Therefore, in one embodiment of the present disclosure, a method in which a third party server generates a CGA is also provided. The DHCP server sends the corresponding network configuration and the client configuration to the third party server, and the third party server generates a CGA and returns the generated CGA to the DHCP server, thereby the using burden of the DHCP server may be alleviated, and the generation of a CGA may be accelerated. Similarly, when the third party server generates a CGA, if the network configuration is different from the client configuration, the configuration with a higher priority is selected from the network configuration and the client configuration according to the configuration priority to generate a CGA. In another embodiment of the disclosure, the DHCP server sends the configuration with a higher priority between the network configuration and the client configuration to the third party server according to the priorities of the network configuration and the client configuration, and the third party server directly generates a CGA without judgment when receiving the configuration.

In the configuration method of a CGA, through the DHCP message exchange between the DHCP server and the client, the CGA generated on the DHCP server satisfies the requirements of the network configuration, so that the generation of CGA can be intervened at the network management level, and an administrable capability of the network may be improved. Additionally, if the DHCP server executes the algorithm of generating a CGA, cost of the client may be reduced. By extending the network configuration from the DHCP server, the CGAs generated by the clients in the network may be extended, thereby an extensibility of the CGAs may be improved.

Figure 5A:
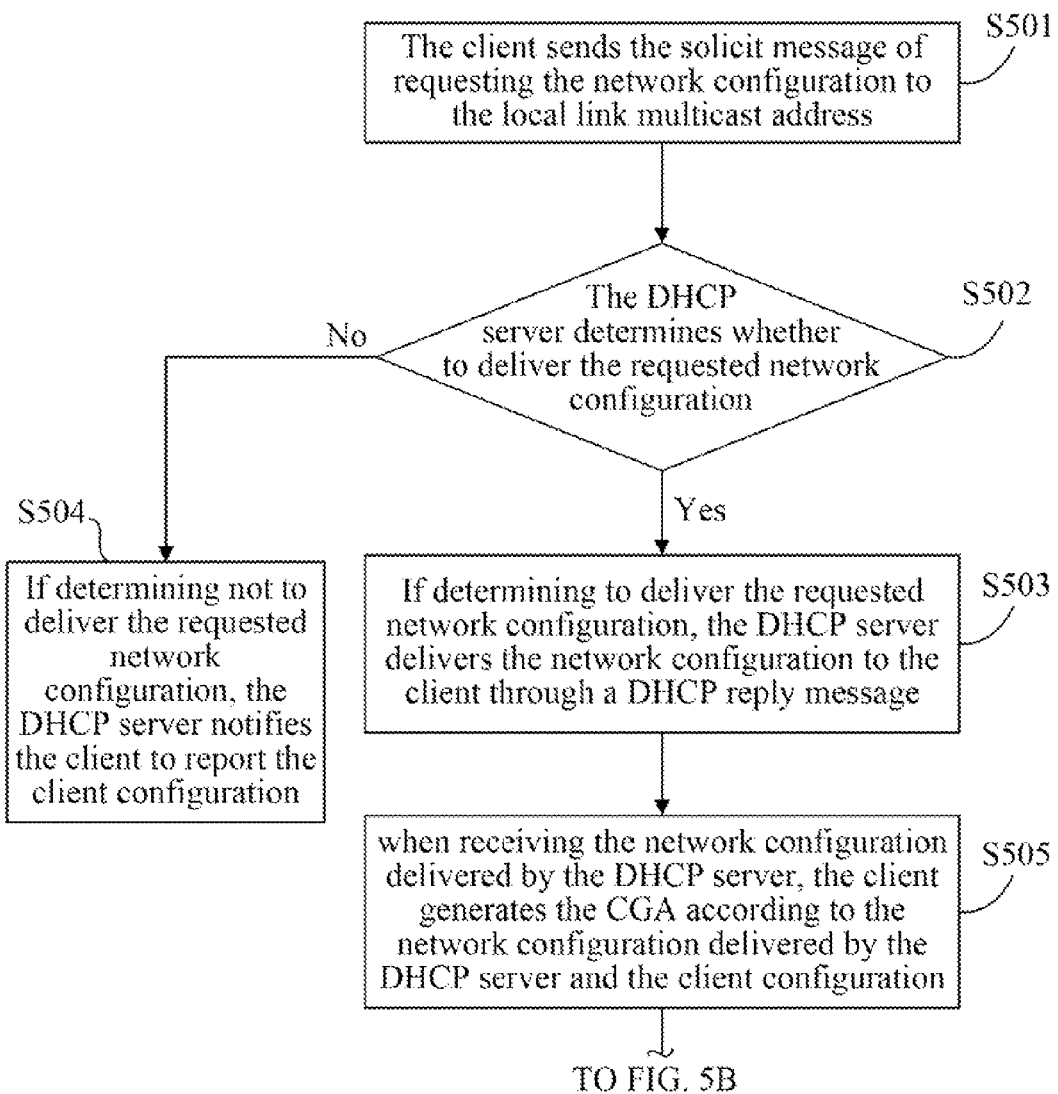
FIG. 5A-5B is a flow chart of a configuration method of a CGA according to a second embodiment of the present disclosure.
Figure 5B:
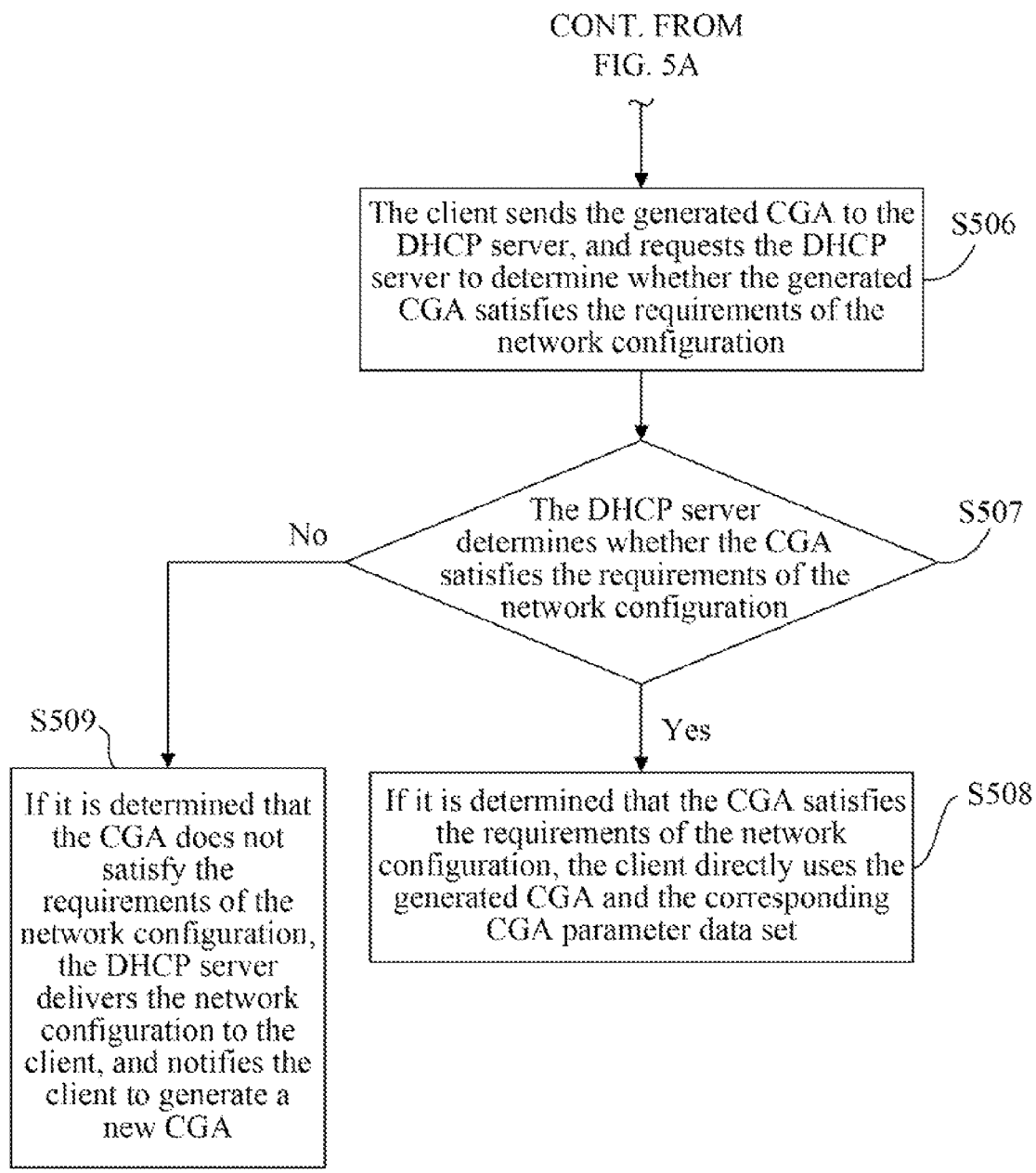

FIG. 5A-5B is a flow chart of a configuration method of a CGA according to a second embodiment of the present disclosure. Referring to FIG. 5A-5B, in this embodiment, the client requests the DHCP server to send the network configuration, the client generates a CGA according to the network configuration and the corresponding client configuration, and the DHCP server determines whether the generated CGA satisfies the requirement of the network configuration. In this embodiment of the present disclosure, when the DHCP server does not deliver the network configuration, the DHCP server generates a CGA and delivers the CGA to the client. The method according to this embodiment includes the following steps.

In step S501, the client sends the solicit message of requesting the network configuration to a local link multicast address. The DHCP solicit message is as described in the two-message mode, that is, the client requests the DHCP server to deliver the network configuration, and the client generates a CGA according to the network configuration. The objective of the DHCP solicit message is to request the DHCP server to deliver the network configuration instead of finding a valid DHCP server. When a plurality of valid DHCP servers exist, the client may select a first replying DHCP server from the valid DHCP servers, and requests the first replying DHCP server to deliver the network configuration. The client may also select a DHCP server from the valid DHCP servers according to a preset priority, and requests the selected DHCP server to deliver the network configuration.

In step S502, when receiving the DHCP solicit message, the DHCP server determines whether to deliver the requested network configuration. If the DHCP server designates itself to generate a CGA for the client, or the DHCP server considers that the network configuration cannot be delivered, the DHCP server determines not to deliver the network configuration to the client.

In step S503, if the DHCP server determines to deliver the requested network configuration, the DHCP server delivers the network configuration to the client through a DHCP reply message. Here, the CGA parameter may be added to the reply message by using an extended DHCP protocol. The network configuration may include the agent client public key, the CGA security level set by the DHCP server, or other parameters.

In step S504, if the DHCP server determines not to deliver the requested network configuration, the DHCP server instructs the client to report the client configuration, and the client directly reports the client configuration through a DHCP request message when receiving the notification of reporting the client configuration. When receiving the client configuration, the DHCP server generates a CGA according to the client configuration and the network configuration, and delivers the CGA to the client when determination, that is, the configuration method of a CGA in which the DHCP server generates a CGA according to the first embodiment of the present disclosure is executed.

In step S505, when receiving the network configuration delivered by the DHCP server, the client generates a CGA according to the network configuration delivered by the DHCP server and the client configuration. Similarly, if the client configuration is different from the network configuration, the configuration with a higher priority is selected from the client configuration and the network configuration to generate a CGA. Thus, through the network configuration from the DHCP server, all the clients in the network may be uniformly set, for example, the security level of generating the CGA by all the clients in the network may be uniformly set. If the client configuration is the same as the network configuration, the client configuration or the network configuration may be randomly selected to generate a CGA. Usually, the priority of the network configuration from the DHCP server is set to be higher than any client configuration, so when the client configuration is different from the network configuration, the network configuration is selected to generate a CGA.

In step S506, the client sends the generated CGA to the DHCP server, and requests the DHCP server to determine whether the generated CGA satisfies the requirements of the network configuration. The generated CGA may be sent to the DHCP server through a DHCP solicit message, and the generated CGA may be added to the solicit message through an extended DHCP protocol.

In step S507, when receiving the DHCP solicit message, the DHCP server determines whether the CGA carried in the DHCP solicit message satisfies the requirements of the network configuration, and returns a confirmation result to the client through a DHCP reply message. The CGA and the corresponding CGA parameters may be added to the DHCP reply message by using an extended DHCP protocol.

In step S508, if it is determined that the CGA satisfies the requirements of the network configuration, the client may directly use the generated CGA and the corresponding CGA parameter data set, and the receiving end may verify the generated CGA through the CGA parameter data set. The CGA parameter data set may include actual parameter values of all the information actually used when the CGA is generated, for example, the agent client public key, the actual CGA security level used finally, or other configuration information.

In step S509, if it is determined that the CGA does not satisfy the requirements of the network configuration, the DHCP server may add the network configuration to the corresponding DHCP reply message, and instruct the client to generate a new CGA. Similarly, the new CGA generated by the client needs to be determined by the DHCP server. Only the CGA determined by the DHCP server can be used by the client. In this step, in addition to generating the new CGA by the client, the DHCP server may also generate a new CGA, and sends the new CGA to the client when determination. The step of generating a new CGA by the DHCP server is the same as the configuration method of a CGA in which the DHCP server generates the CGA according to the first embodiment of the present disclosure.

In the configuration method of a CGA, through the DHCP message exchange between the DHCP server and the client, a generated CGA satisfies the requirements of the network configuration, so that the generation of CGA can be intervened at the network management level, and the administrable capability of the network may be improved. Optionally, by extending the network configuration from the DHCP server, the CGAs generated by the clients in the network may be extended, thereby the extensibility of the CGAs may be improved.

Figure 6:
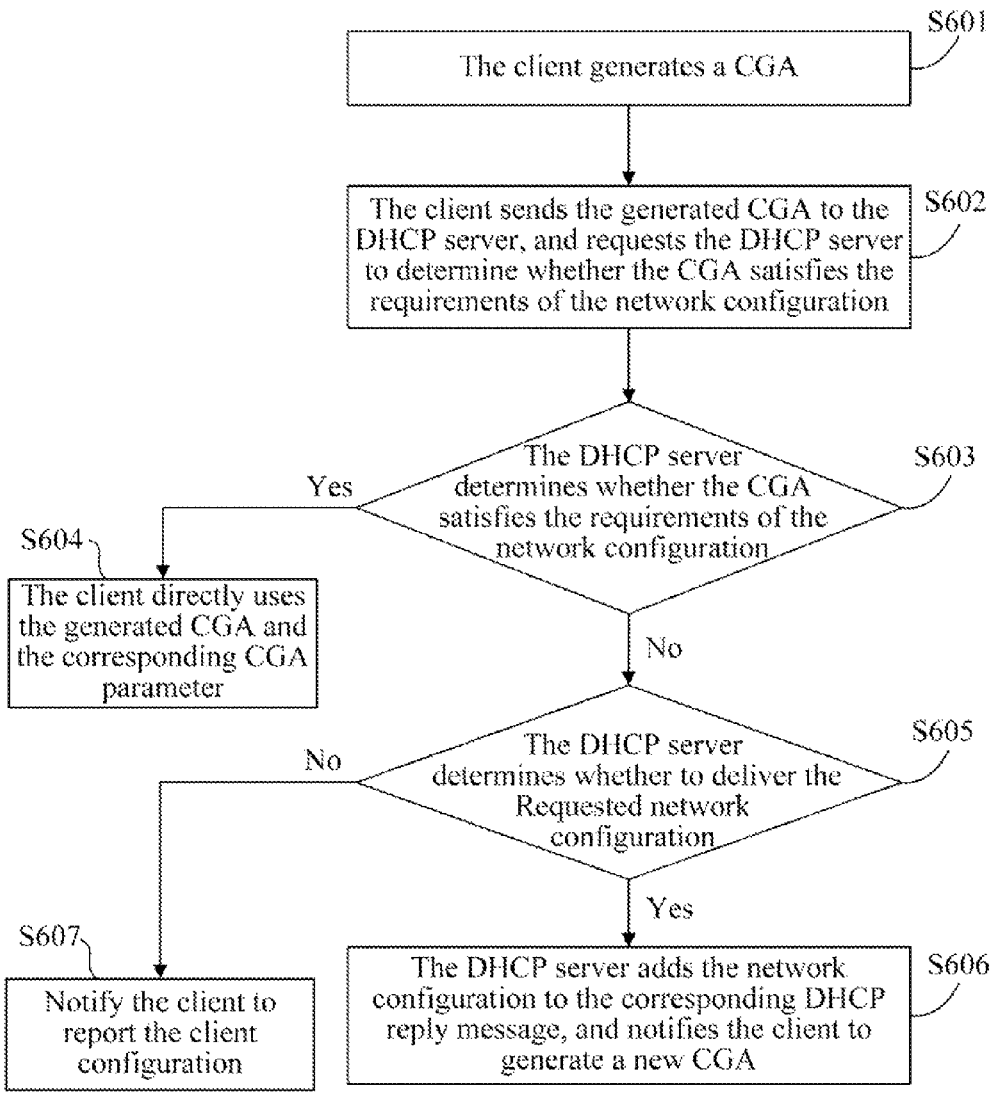
FIG. 6 is a flow chart of a configuration method of a CGA according to a third embodiment of the present disclosure.

FIG. 6 is a flow chart of a configuration method of a CGA according to a third embodiment of the present disclosure. Referring to FIG. 6, in this embodiment, the client generates a corresponding CGA, but it is not required whether the CGA is generated according to only the client configuration or according to the client configuration and the network configuration, because a CGA generated according to the client configuration may satisfy the requirements of the network configuration. Thus, the DHCP message exchange between the client and the DHCP server may be reduced.

In step S601, the client generates a CGA, in which a subnetwork prefix may be acquired through a route broadcast message; the CGA generated by the client may be generated according to only the client configuration or according to the client configuration and the network configuration.

In step S602, the client sends the generated CGA to the DHCP server, and requests the DHCP server to determine whether the CGA satisfies the requirements of the network configuration. The generated CGA may be sent to the DHCP server through a DHCP solicit message, and the generated CGA may be added to the DHCP solicit message through an extended DHCP protocol.

In step S603, when receiving the DHCP solicit message, the DHCP server determines whether the CGA carried in the solicit message satisfies the requirements of the network configuration, and returns a confirmation result to the client.

In step S604, if it is determined that the CGA satisfies the requirements of the network configuration, the client may directly use the generated CGA and the corresponding CGA parameter data set, and the receiving end may verify the generated CGA through a CGA parameter data set. The CGA parameter data set may include actual parameter values of all the information actually used when the CGA is generated, for example, the agent client public key, the actual CGA security level used finally, or other configuration information.

In step S605, if it is determined that the CGA does not satisfy the requirements of the network configuration, the DHCP server determines whether to deliver the requested network configuration. If the DHCP server designates itself to generate a CGA for the client, or the DHCP server considers that the network configuration cannot be distributed, the DHCP server determines not to deliver the network configuration to the client.

In step S606, if determining to deliver the requested network configuration, the DHCP server may add the network configuration to a corresponding DHCP reply message, and instruct the client to generate a new CGA. Similarly, the new CGA generated by the client also needs to be determined by the DHCP server, and only the CGA determined by the DHCP server can be used by the client.

In step S607, if determining not to deliver the requested network configuration, the DHCP server instructs the client to report the client configuration, the client directly reports the client configuration through a DHCP request message when receiving the notification of reporting the client configuration. When receiving the client configuration, the DHCP server generates a CGA according to the client configuration and the network configuration, and delivers the CGA to the client after determination, that is, the configuration method of a CGA in which the DHCP server generates a CGA according to the first embodiment of the present disclosure is executed.

In the configuration method of a CGA, through the DHCP message exchange between the DHCP server and the client, a generated CGA satisfies the requirements of the network configuration, so that the generation of CGA can be intervened at the network management level, and the administrable capability of the network is improved. Optionally, by extending the network configuration from the DHCP server, a CGAs generated by the clients in the network may be extended, thereby the extensibility of the CGAs may be improved.

Through the above description in the detailed description, it is clear to persons skilled in the art that the embodiments of the present disclosure may be accomplished through hardware, or through software plus a necessary universal hardware platform. Base on this, the technical solutions of the embodiments of the present disclosure may be embodied in the form of a software product. The software product may be stored in one or more nonvolatile storage media (for example, CD-ROM, USB flash drive, or removable hard disk) and contain several instructions configured to instruct computer equipment (for example, a personal computer, a server, or network equipment) to perform the method according to the embodiments of the present disclosure.

The above are merely preferred embodiments of the present disclosure. It should be noted that persons of ordinary skill in the art can make modifications and variations without departing from the principles of the present disclosure, and such modifications and variations shall fall within the protection scope of the present disclosure.

What is claimed is:

1. A configuration method of a cryptographically generated address (CGA), used to enable a generated CGA to satisfy requirements of a network configuration, comprising:
   receiving, by a Dynamic Host Configuration Protocol (DHCP) server, a client configuration sent from a client, wherein the client configuration comprises a client public key and a CGA security level designated by the client;
   generating, by the DHCP server, a CGA according to the configuration with a higher priority from the client configuration and the network configuration, wherein the network configuration comprises a CGA security level set by the DHCP server; and
   delivering, by the DHCP server, the CGA to the client.

2. The method according to claim 1, wherein before receiving, by the DHCP server, the client configuration information sent from the client, the method further comprises:
   receiving, by the DHCP server, a solicit message sent from the client to a local link multicast address; and
   responding with, by the DHCP server, an advertisement message to the client if determining that the DHCP server satisfies requirements of the client, and sending, by the client, the client configuration information to the DHCP server when receiving the advertisement message.

3. The method according to claim 1, wherein before receiving, by the DHCP server, the client configuration information sent from the client, the method further comprises:
   receiving, by the DHCP server, a solicit message of requesting the network configuration information sent from the client to a local link multicast address;
   determining, by the DHCP server, whether to deliver the network configuration when receiving the requirements; and
   instructing, by the DHCP server, the client to report the client configuration if determining not to deliver the network configuration.

4. The method according to claim 1, wherein the generating, by the DHCP server, a CGA according to the configuration with a higher priority from the client configuration and the network configuration from the DHCP server comprises:
   sending, by the DHCP server, the configuration with a higher priority from the client configuration and the network configuration to a third party server, generating, by the third party server, a CGA, and returning the generated CGA to the DHCP server.

5. The method according to claim 1, wherein the generating, by the DHCP server, a CGA according to the configuration with a higher priority from the client configuration and the network configuration comprises:
   sending, by the DHCP server, the client configuration and the network configuration to a third party server;
   generating, by the third party server, a CGA according to the configuration with a higher priority from the client configuration and the network configuration and returning the generated CGA to the DHCP server.

6. A configuration method of a cryptographically generated address (CGA), used to enable a generated CGA to satisfy requirements of a network configuration, comprising:
   generating, by a client, a CGA;
   sending, by the client, the generated CGA to a Dynamic Host Configuration Protocol (DHCP) server, and requesting the DHCP server to determine whether the generated CGA satisfies the requirements of the network configuration, wherein the network configuration comprises a CGA security level set by the DHCP server; and
   generating a new CGA if the generated CGA does not satisfy the requirements of the network configuration.

7. The method according to claim 6, wherein the generating the new CGA comprises:
   receiving, by the client, the network configuration sent from the DHCP server, and generating the new CGA according to the configuration with a higher priority from a client configuration and the network configuration, wherein the client configuration comprises a client public key and a CGA security level designated by the client; and
   resending, by the client, the generated new CGA to the DHCP server, and requesting the DHCP server to determine whether the generated new CGA satisfies the requirements of the network configuration.

8. The method according to claim 6, wherein the generating the new CGA comprises:
   sending, by the client, a client configuration thereof to the DHCP server, wherein the client configuration comprises a client public key and a CGA security level designated by the client; and
   generating, by the DHCP server, the CGA according to the configuration with a higher priority from the client configuration and the network configuration.

9. The method according to claim 6, wherein the generating, by the client, the CGA comprises:
   sending, by the client, a solicit message of requesting the network configuration to a local link multicast address;
   receiving, by the client, an answer message returned from the DHCP server, wherein the answer message carries the network configuration and the network configuration comprises a CGA security level set by the DHCP server; and
   generating, by the client, the CGA according to the configuration with a higher priority from a client configuration and the network configuration.

10. A configuration system of a cryptographically generated address (CGA), comprising a Dynamic Host Configuration Protocol (DHCP) server and at least one client, wherein
the client is configured to send a client configuration of the client to the DHCP server, wherein the client configuration comprises a client public key and a CGA security level designated by the client; and
the DHCP server is configured to generate a CGA according to the configuration with a higher priority from the client configuration information sent from the client and a network configuration from the DHCP server, and deliver the CGA to the client, wherein the network configuration comprises a CGA security level set by the DHCP server.

11. The system according to claim 10, further comprising a third party server, configured to receive the configuration with a higher priority from the network configuration and the client configuration, wherein the configuration with a higher priority is sent by the DHCP server, generate the CGA according to the configuration with a higher priority from the network configuration and the client configuration, and return the generated CGA to the DHCP server.

12. The system according to claim 10, further comprising a third party server, configured to receive the client configuration and the network configuration from the DHCP server; generate a CGA according to the configuration with a higher priority from the client configuration and the network configuration and return the generated CGA to the DHCP server.

13. A Dynamic Host Configuration Protocol (DHCP) server, comprising:
a configuration receiving and saving module, configured to receive and save a client configuration sent from a client, wherein the client configuration comprises a client public key and a CGA security level designated by the client;
a cryptographically generated address (CGA) address generating module, configured to generate a CGA according to the client configuration saved by the configuration receiving and saving module and a network configuration from the DHCP server, wherein the network configuration comprises a CGA security level set by the DHCP server; and
a CGA delivering module, configured to deliver the CGA generated by the CGA generating module to the client, wherein the CGA generating module comprises:
a same determining sub-module, configured to determine whether the client configuration is the same as the network configuration; and
a priority selecting sub-module, configured to select the configuration with a higher priority to generate the CGA if the same determining sub-module determines that client configuration is different from the network configuration.

14. The DHCP server according to claim 13, further comprising:
a delivery determining module, configured to determine whether to deliver the network configuration after receiving a solicit message of requesting the network configuration sent from the client;
a network configuration delivering module, configured to deliver the network configuration to the client through a DHCP answer message after the delivery determining module determines to deliver the network configuration; and
a notification module, configured to instruct the client to report the client configuration when the delivery determining module determines not to deliver the network configuration.

15. A configuration system of a cryptographically generated address (CGA), comprising:
at least one client, configured to generate the CGA; and
a Dynamic Host Configuration Protocol (DHCP) server, configured to determine whether the CGA generated by the client satisfies requirements of a network configuration, wherein the network configuration comprises a CGA security level set by the DHCP server.

16. The configuration system of a CGA according to claim 15, wherein the DHCP server is further configured to require the client to report a client configuration after determining that the generated CGA does not satisfy the requirements of the network configuration, generate a new CGA according to the client configuration and the network configuration, and deliver the new CGA to the client after determining that the new CGA satisfies the requirements of the network configuration.

17. A client, comprising:
a cryptographically generated address (CGA) generating module, configured to generate a CGA; and
a CGA determining module, configured to send the CGA generated by the CGA generating module to a Dynamic Host Configuration Protocol (DHCP) server, and request the DHCP server to determine whether the CGA satisfies requirements of a network configuration, wherein the network configuration comprises a CGA security level set by the DHCP server.

18. The client according to claim 17, further comprising a configuration sending module, configured to send a client configuration required when the DHCP generates a new CGA to the DHCP server after the CGA determining module receives a confirmation result of the DHCP server that the CGA does not satisfy the requirements of the network configuration, wherein the client configuration comprises a client public key and a CGA security level designated by the client.

19. The client according to claim 17, further comprising a configuration requesting module, configured to send a solicit message of requesting the network configuration to a local link multicast address, and instruct the CGA generating module to generate the CGA according to the configuration with a higher priority from the network configuration and a client configuration if the DHCP server delivers the network configuration.

20. The client according to claim 19, wherein the CGA determining module is further configured to instruct the configuration requesting module to resend the solicit message of requesting the network configuration to the local link multicast address after receiving a confirmation result of the DHCP server that the CGA does not satisfy the requirements of the network configuration; and
the CGA generating module is further configured to generate a new CGA according to the network configuration requested by the configuration requesting module.

21. The client according to claim 17, wherein the CGA generating module is configured to generate the CGA according to a client configuration.

22. The client according to claim 21, wherein the CGA generating module further comprises:
a sameness determining sub-module, configured to determine whether the client configuration is the same as the network configuration; and
a priority selecting sub-module, configured to select the configuration with a higher priority to generate the CGA if the sameness determining sub-module determines that the client configuration is different from the network configuration.

* * * * *